Jan. 18, 1966     A. L. HESTON ETAL     3,229,329
TIRE CURING PRESS AND LOADER THEREFOR
Filed July 29, 1963     4 Sheets-Sheet 3
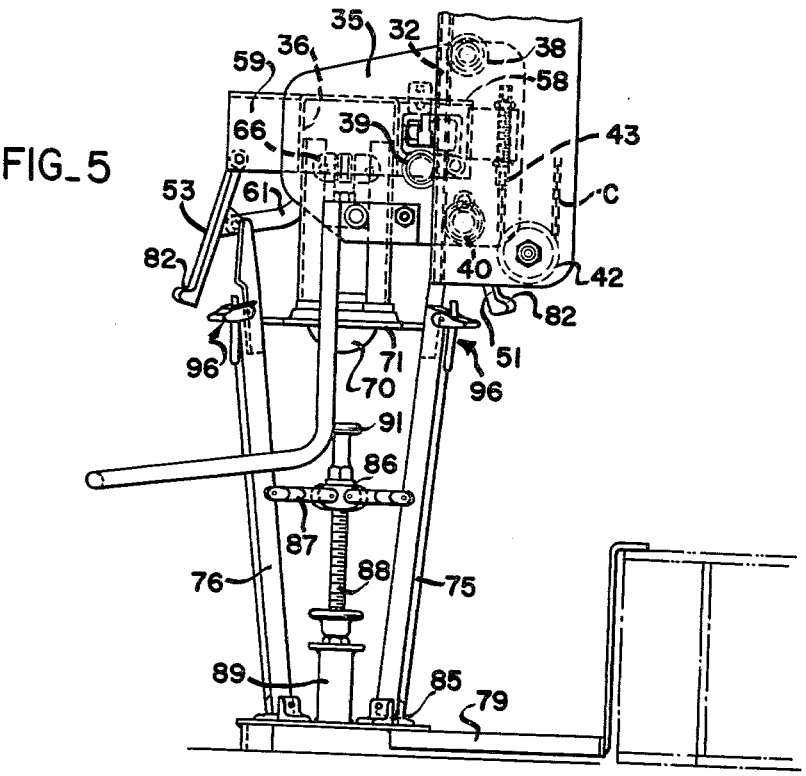
FIG_5
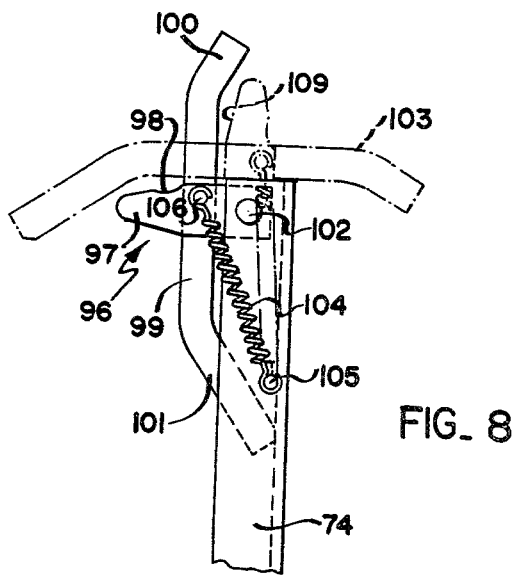
FIG_8
INVENTORS
ALLEN L. HESTON &
STEPHEN F. BREZA
BY
Oberlin, Maky & Donnelly
ATTORNEYS Jan. 18, 1966  A. L. HESTON ETAL  3,229,329
TIRE CURING PRESS AND LOADER THEREFOR
Filed July 29, 1963  4 Sheets-Sheet 4
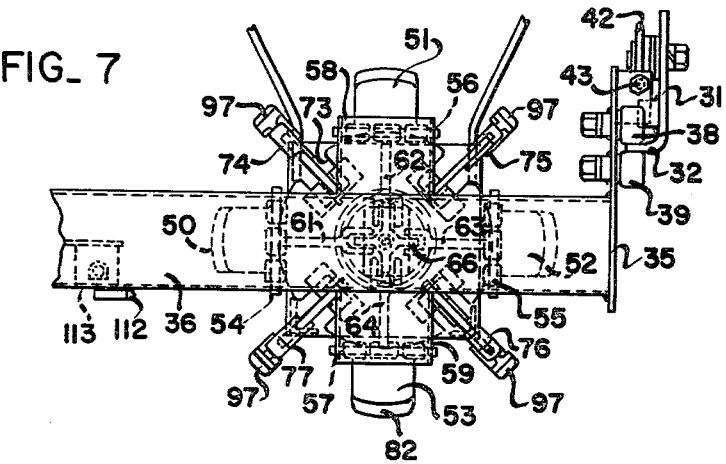
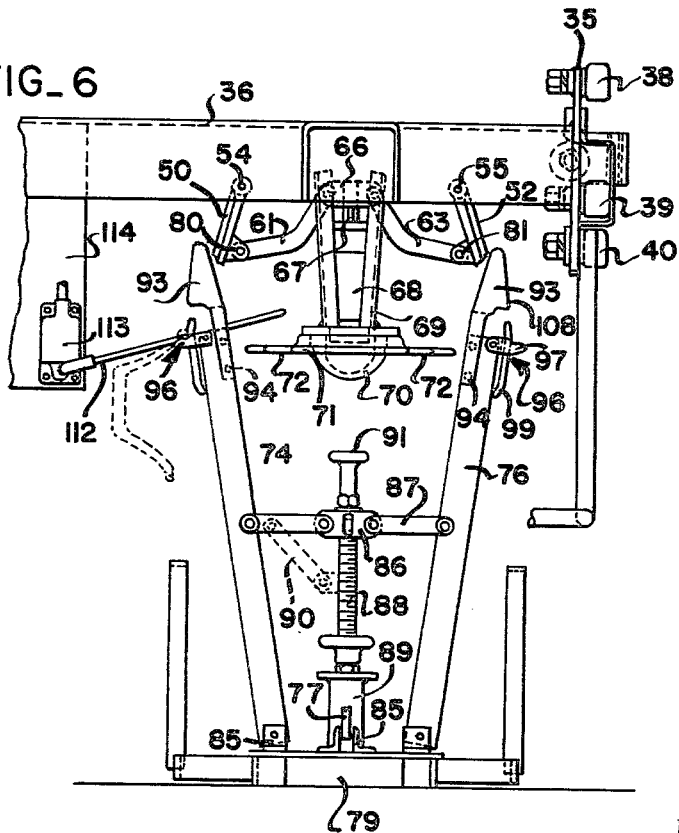
INVENTORS
ALLEN L. HESTON &
STEPHEN F. BREZA
BY
Oberlin, Maky & Donnelly
ATTORNEYS United States Patent Office 3,229,329
Patented Jan. 18, 1966

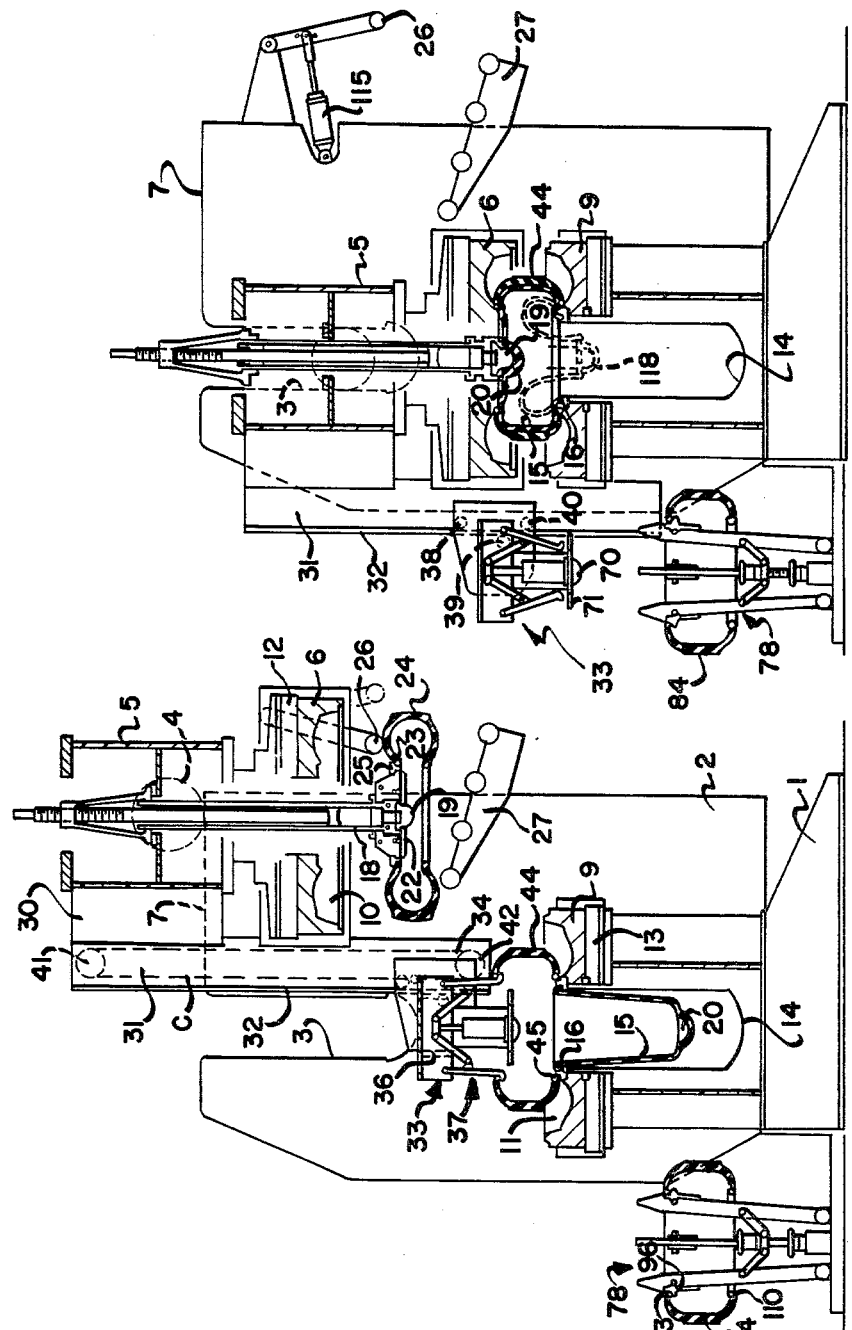

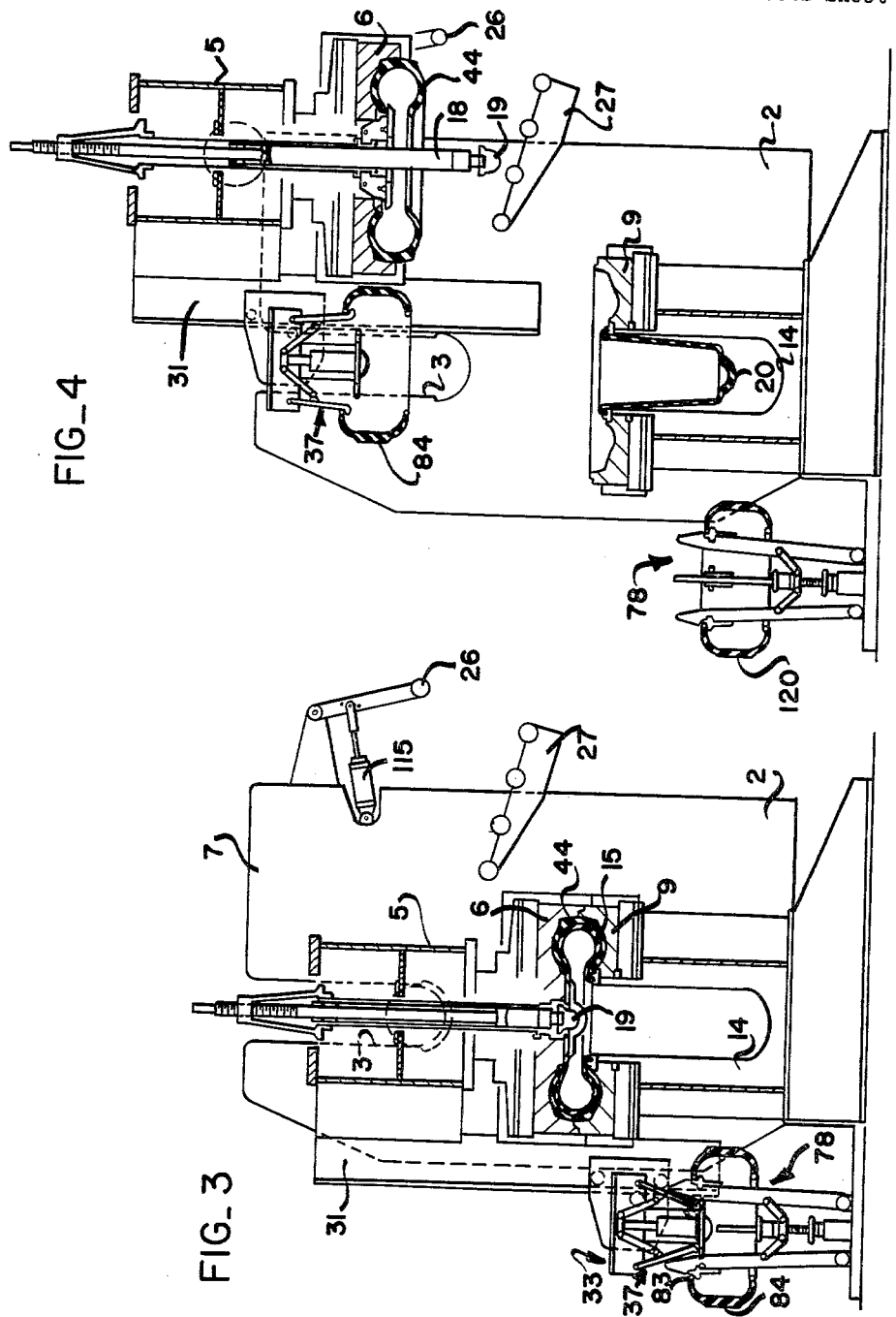

3,229,329
TIRE CURING PRESS AND LOADER THEREFOR
Allen L. Heston, Akron, and Stephen F. Breza, Cuyahoga Falls, Ohio, assignors to NRM Corporation, a corporation of Ohio
Filed July 29, 1963, Ser. No. 298,152
16 Claims. (Cl. 18—2)

This invention relates generally as indicated to a tire curing press and loader therefor and more particularly to a press and loading mechanism for the production of tires from preformed carcasses.

More conventional green tire carcasses generally comprise cylindrical tubular bands which are self-supporting and will stand upright on a simple pilot or like fixture in front of the press so that a loading chuck may grip the carcass either externally or internally. However, tire carcasses having two plies are generally preformed to a sectional C-shape and are of such flimsy nature that they are not self-supporting. The walls of the carcass when placed axially upright will collapse with the beads coming together precluding an internal chuck grip for loading purposes and the flimsy nature of the carcass precludes an external chuck grip. Such two ply tires are facetiously called "rags" in the tire building industry and this gives an indication of the limp nature of the carcass which presents difficult automatic loading problems. It will, however, be understood that such two ply tires are capable of having a four or better ply rating.

Such two ply preformed tire carcasses accordingly could not normally be loaded into a tire press with the external chuck grip mechanism shown, for example, in Mallory et al. Patent No. 3,065,503 dated November 27, 1962, entitled "Tire Curing Press Carcass Loader."

It is accordingly a principal object of the present invention to provide certain improvements in a tire curing press of the type shown in such Mallory et al. Patent No. 3,065,503 enabling the same to load and cure preformed carcasses of a flimsy nature.

Another principal object is the provision of a combination loading chuck and stand, the latter holding the carcass for proper gripping by the former.

Another object is the provision of a loader for a tire curing press which will suspend the carcass therefrom and maintain such carcass in position on the bottom mold section of the press to be gripped internally by a forming bladder.

Still another object is the provision of a pilot stand for a carcass which will hold the carcass in a properly opened position to be gripped internally by a tire chuck for a tire curing press.

Other objects and advantages of the present invention will become aparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a schematic vertical section taken through one of the cavities of the dual cavity press illustrated showing the press and loader therefor with a tire carcass positioned on the loading stand, a carcass held by the loading chuck on the bottom mold section, and a cured tire held by the chuck of the top mold section about to be discharged from the press;

FIG. 2 is a similar schematic section illustrating the mold sections closing with the tire chuck now empty and repositioned about to grip the carcass held by the stand;

FIG. 3 is a similar schematic section showing the press now fully closed and the loader chuck now in position to engage the carcass held by the stand;

FIG. 4 is a similar schematic section illustrating the press in the position of its cycle just prior to its position shown in FIG. 1 with a new carcass now positioned on the stand;

FIG. 5 is an enlarged fragmentary side elevation of the stand and chuck of the loader in the approximate position shown in FIG. 3;

FIG. 6 is an enlarged fragmentary front elevation as seen from the left in FIG. 5 with the stand rotated 45° for clarity of illustration;

FIG. 7 is a fragmentary top plan view of the mechanism shown in FIGS. 5 and 6; and FIG. 8 is an enlarged detail view of the carcass bead supporting mechanism of the stand.

Referring now to the annexed drawings and more particularly to FIGS. 1 through 4, there is illustrated a tire curing press of the type shown in such aforementioned Mallory et al. Patent No. 3,065,503 which comprises a base 1 having two upstanding cam plates 2 secured to the opposite sides thereof, each of which is formed with a vertical guide slot 3 for a guide roller 4, such rollers 4 supporting the press head 5 therebetween and thus between the cam plates 2. The press head 5 carries the top mold section 6 for vertical and lateral movement as the rollers 4 move up the slot 3 and back along the top edge 7 of the cam plates 2, respectively. As the supporting rollers 4 for the press head 5 approach the bottom of the slot 3, the top mold section 6 will mate with the bottom mold section 9 which is fixedly supported on the base 1. The mold sections 6 and 9 are each provided with cavities 10 and 11 which when the mold sections mate form the mold for the finished tire. Platens for the circulation of steam therethrough are provided at 12 and 13 so that the shaped tire within the mold may be heated for vulcanization.

The base 1 is provided with a well 14 which receives a bladder or bag forming device 15 secured at its annular edge to the bottom toe ring 16 for the bottom mold section 9. In its FIG. 1 position, the bladder 15 is shown invaginated and within the well 14. In this position, the bottom mold section is cleared for overhead loading. The movement of the bladder 15 may be controlled by pressurizing the well 14.

The press head 5 contains a vertically extensible bladder ram 18 having a ball nose 19 adapted to engage recess 20 in the bladder 15 to invaginate or push the bladder to its FIG. 1 position. Veertical movement of the ram 18 also radially moves chucking segments 22 causing them to underlie the upper bead 23 of a shaped and vulcanized tire 24. The upper bead 23 of the tire 24 is then trapped between the segments 22 and the top toe ring 25 which may be moved downwardly away from the top mold section 6 stripping the finished tire therefrom. A stripping bar 26 may be interposed between the thus vertically positioned tire 24 so that when the segments 22 are retracted and the ring 25 elevated to its position within the mold 6, the bar will then strip the tire top bead 23 from the toe ring 25, causing the tire to drop on discharge conveyor 27. For a more clear disclosure of such a tire holding mechanism and bag inverter reference may be had to U.S. Patent No. 3,097,394 issued July 16, 1963 to Edwin E. Mallory et al. for "Tire Curing Press."

It will be understood that the press head 5 is maintained in its vertically extending position throughout the movement of the rollers 4 on the top edge 7 of the cam plates 2 as well as within the vertically extending slots 3. When the rollers 4 are within the slots 3, the top mold section 6 will then be vertically aligned with the bottom mold section 9 as indicated in FIGS. 2 and 3. In this position, not only will the bladder ram 18 be vertically aligned with the recess 20 in the bladder 15 within the well 14, but the top mold section 6 will also be vertically aligned with the bottom mold section 9. It will be understood that the press illustrated may be of the dual cavity type having two side-by-side bottom mold sections 9 and two side-by-side top mold sections 6. In this manner, two tires may be cured simultaneously when the press closes.

Mounted on the press head 5 are two brackets 30 supporting vertically extending guides 31 which may be inwardly adjacent the cam plates 2. Each guide is provided with an inwardly directed rail or flange 32 and horizontally supported between such side rails is a loader shown generally at 33.

The loader 33 includes side plates 34 and 35 between which extends a horizontal inverted channel-shape beam 36 supporting loader chucks 37 for each of the two sets of mold sections of the press. The two chucks may be substantially identical in form and accordingly only one is shown and described in detail.

The loader side plates 34 and 35 are each provided with outwardly projecting rollers 38, 39 and 40 with the rollers 38 and 40 being vertically aligned and on the interior of the flange or rail 32 while the roller 39 is on the exterior of such rail. In this manner, the rollers straddle the rail 32 holding the loader in proper position with respect thereto. The loader may be raised and lowered along the guide rails by means of a chain C trained about sprockets 41 and 42 and secured at each end to the loader side plates as indicated at 43. The top sprocket 41 may be driven by a motor thus to raise and lower the loader 33 along the guides 31. When the press head 5 is open or in the FIG. 1 position, the guides 31 will be moved vertically and laterally with respect to the bottom mold section 9 in the same manner as the top mold section 6. The loader 33 is accordingly mounted not only for vertical movement along the guides 31, but also for vertical and lateral movement with the press head. When the press is open or in the FIG. 1 position, vertical movement of the chucks 37 downwardly along the guides 31 will place the tire carcass 44 held by such chucks in the position shown on the bottom mold section. The chuck will normally be lowered to cause the bottom bead 45 of the carcass 44 to engage the bottom toe ring 16 and the chuck will then not further be lowered otherwise the carcass would collapse due to its relatively flimsy nature and preclude the bag forming bladder 15 from properly entering the carcass when the well 14 is pressurized.

Referring now additionally to FIGS. 5, 6 and 7, each loader chuck 37 comprises four suspended chuck segments 50, 51, 52 and 53 with the segments 50 and 52 being pivoted between the legs of the main inverted channel beam 36 as indicated at 54 and 55, respectively while the segments 51 and 53 are pivoted at 56 and 57, respectively, between the legs of transversely extending channel beams 58 and 59. Links 61, 62, 63, and 64 interconnect the respective segments 50 through 53 with a cruciform actuator 66 mounted on rod 67 of a vertically extending piston-cylinder assembly 68. Supported beneath the piston-cylinder assembly 68 on struts 69 is a ball nose 70 and a bladder plate 71. Such bladder plate 71 is provided with radially extending slots or cut-out portions 73, such being four in number and quadrant spaced. The cut-out portions are offset 45° from the segments 50 through 53 and cooperate with the posts 74, 75, 76 and 77 of loader stand 78 mounted on a special base 79 directly in front of the press. There will, of course, be two such stands 78 directly in front of the press corresponding to the two chucks of the loader 33 and the two cavities of the press.

The chuck segments 50 through 53 may be swung simultaneously and uniformly about their proximal pivots 54, 56, 55 and 57, respectively, by vertical movement of the cruciform actuator 66 occasioned by movement of the piston-cylinder assembly 68. The links 61 through 64 are bent as indicated in FIG. 6 to clear the top of the piston-cylinder assembly and so that they may be pivotally attached to the backs of the chuck segments substantially spaced from the proximal pivots as indicated at 80 and 81 for the segments 50 and 52 in FIG. 6. The segments may be arcuate in form properly interiorly to grip the tire carcass and are each provided at their distal ends with a shelf 82 of the same arcuate form which will fit beneath the upper bead 83 of carcass 84 supported on stand 78. When the chuck is contracted the shelves 82 will move back just above the bladder plate 71. When expanded, the segments will move radially beyond the subjacent plate.

The chuck segments may accordingly be contracted by extension of the piston-cylinder assembly 68 and vertically moved into the carcass 84 by movement of the loader 33 downwardly along the guides 31 when the press is in its closed position as indicated in FIG. 3. In such position, the chucks will be vertically aligned with each stand 78. When the bottom edge or the shelves 82 are within the tire carcass 84, the piston-cylinder assembly 68 may be retracted radially expanding the chuck segments causing the shelves 82 to move beneath the bead 83 and the segments will then firmly grip the top bead of the carcass 84 to be loaded.

As indicated perhaps more clearly in FIGS. 5 and 6, the posts 74 through 77 are each pivoted at their lower ends to brackets 85 on the base 79 for swinging movement about their base pivots toward and away from each other. Simultaneous uniform pivotal movement of the posts is obtained by a vertically movable cruciform actuator 86 which is connected to each of the posts by links 87. Vertical movement of the actuator 86 may be obtained by threading screw shaft 88 into pedestal 89, such shaft being freely rotatable within the actuator 86. Vertical downward movement of the actuator 86 will cause the links 87 to assume the position such as that shown at 90 uniformly simultaneously pivoting the posts inwardly to change the radial positions thereof so that the stand will accommodate tire carcasses of different sizes. Rotation of the screw shaft 88 may readily be accomplished by hand wheel 91 on the top thereof.

The tops of each of the four posts 74 through 77 may be provided with pointed pilot or guide members 93 secured to the posts by fasteners indicated at 94 with the peaks of the pilots being rounded to avoid catching or damaging the tire carcass. Pivotally mounted carcass bead supports 96 are mounted at the upper outer corner of each post. Each bead support 96 includes a relatively short member 97 which will normally support the underside of the top bead 83 of the carcass 84 when the same is in position on the stand to be picked up by the chuck 37. A notch 98 may be provided in the top surface thereof to facilitate the proper retainment of the carcass bead ring. A guide member 99 having bent ends 100 and 101 extends generally normal through the relatively shorter member 97 and a recess may be provided in the supporting posts to accommodate the bent end 101 when the mechanism 96 is in the full line position indicated, for example, in FIG. 8. The member 97 is pivoted at 102 to the top outermost corner of the posts and the entire mechanism is free to swing approximately 90° about such pivot from the full line position to the dotted line position 103. In such dotted line position, the guide bar 99 will extend generally horizontal with the bent end 101 projecting downwardly and outwardly and the member 97 will project straight up.

A tension spring 104 is connected to dowel 105 on the post 74 at its lower end and to dowel 106 on the member 97 at its upper end resiliently to hold the mechanism 96 in either its full line or dotted line position. It will be understood that when the axis of the dowel 106 pivots over center beyond the line between the dowel 105 and the pivot 102, the mechanism will be resiliently held in such position. In the particular arrangement illustrated in FIG. 8, less force will be required to overcome the spring latch in pivoting the mechanism from the dotted line to the full line position than in pivoting the mechanism from the full line to the dotted line position. This is, of course, due to the proximity of the axis of the dowel pin 106 to the pivot 102 in the alternate positions of the mechanism 96.

The outer or guide edge 108 of the guides 93 overhang the mechanism 96 for each post and such edge will constitute a substantial continuation of the bottom 109 of the member 97 when in its vertical position. In this manner, the operator may readily position a carcass over the upstanding pilots to drop onto the mechanism 96. The mechanism will normally be in its dotted line position shown in FIG. 8 and the lower bead 110 of the carcass will engage the guide 99 and the weight of the carcass will cause the mechanism to pivot to its full line position. The bottom bead 110 of the carcass 84 will then drop past the mechanism and the top bead will be caught by the relatively shorter support 97 so that the carcass is held suspended as indicated in FIG. 1. The mechanism 96 then acts somewhat like an escapement mechanism permitting the bottom bead to pass thereby but not the top bead. When the chuck comes in and engages the top bead 83 of the carcass 84 and lifts the carcass from the stand, the bottom bead 110 will catch the bottom edge 109 of the member 97 again pivoting the mechanism to its dotted line position shown in FIG. 8 and the mechanism 96 will then be repositioned to receive the next carcass the operator places thereon. The spring 104 will effectively resiliently hold the mechanism in its alternate positions, but such spring pressure is not so great as to preclude the carcass beads from pivoting the mechanism as desired. The radial adjustment of the posts 74 through 77 afforded by the screw shaft 88 then permits the stand to accommodate any size tire carcass supporting the same by its upper bead so that the carcass side walls will remain separated and so that a loader mechanism or chuck may be properly inserted therein. Radial movement of the posts is, of course, accommodated by the quadrant spaced notches 73 in the bladder plate 71 of the chuck 37 so that there will be no interference between the chuck and stand.

As the loader 33 descends, the chuck segments will normally be retracted by extension of the piston-cylinder assembly 68 and a feeler finger 112 actuating a limit switch 113 mounted on central bracket 114 depending from the beam 36 will detect the position of the carcass 84 with respect to the loader permitting the loader chuck to expand on signal properly engaging the carcass held by the stand. If the operator has not positioned a carcass on the stand, the finger, of course, will not permit the chuck to open and the machine will not proceed through its cycle. The operator will then have to jog the machine and place a carcass on the stand, relowering the loader properly to engage the carcass.

*Operation*

Referring now again to FIGS. 1 through 4, the operation of the press, utilizing the loader and stand of the present invention, will be described in detail. In FIG. 1, the press is illustrated in its slide-back or open position with the top mold section 6 moved vertically and laterally away from the bottom mold section 9. In this position, the tire 24 carried by the top mold section is positioned above the discharge conveyor 27 and the bottom mold section 9 is cleared for overhead loading. The toe ring 25 is moved downwardly to strip the tire from the top mold section and as seen in FIG. 2, piston-cylinder assembly 115 is employed to move stripping bar 26 into position between the tire and the top mold section so that when the chuck segments 22 are retracted and the toe ring 25 elevated, the tire 24 will be stripped from the toe ring to drop onto the conveyor 27.

The loader 33 is shown in FIG. 1 descending and coming into position with the lower bead 45 of the carcass 44 held thereby engaging the bottom bead or toe ring 16 of the bottom mold section 9. FIG. 1 also shows a new carcass 84 now positioned on the stand 78. While the loader chuck 33 holds the green tire carcass 44 in position with the bottom bead ring 45 engaging the toe ring 16, the bladder 15 will be caused to move to the FIG. 2 position by pressurizing the well 14. The bladder then inflates into the carcass 44 while the top bead ring of the carcass is still held by the chuck. As the bladder is inflated into the carcass 44, the ball nose 70 and the bladder plate 71 of the loader chuck will assist in centering the bladder. The ball nose 70 will engage the recess 20 in the bladder in the same manner as the ball nose 19 of the bag inverter. The plate 71 closes the top of the carcass forcing the bladder to expand radially.

Moving to FIG. 2, the loader chuck segments are now retracted and the loader ascends along the guides 31 having released the carcass 44 after it has been gripped and centered by the bladder 15. The press head has now moved laterally, guided by the rollers 4 engaging the top edge 7 of the cam plates 2, and downwardly along the guide slots 3. The nose 19 of the bag inverter 18 having been fully retracted, will engage the recess 20 in the bag serving the same purpose as the ball nose 70. The press head 5 is now moving downwardly to close the press for the vulcanizing cycle. It is noted that although the loader 33 is ascending along the guides 31, it has been moved laterally and downwardly due to the motion of the press head.

If desired, the nose 19 of the ram may be manipulated so that it will meet the bladder recess 20 below the bottom bead ring 16 as indicated by the phantom line position 118 in FIG. 2. The ram may then be retracted at the desired rate obtaining improved centering of the bladder and a controlled rate of bladder movement into the tire. This would be the reverse of the operation, later described, as the ram moves downwardly to invert the bladder back into the well.

In FIG. 3, the press is fully closed and in such position the chucks 37 of the loader 33 will be vertically aligned with the stands 78. The loader now descends to pick up the green tire carcasses 84 previously positioned on the stands 78 by the operator and the retracted segments will enter the tire carcasses and upon signal from the limit switches 113 will open engaging the upper bead of the tire. The shelves 82 of the chuck segments will move beneath the upper bead so that the tire will be elevated from the stand as the loader ascends.

The loader will now ascend along the guides 31 picking up the tire from the stand and will generally move to the top position on the guides. With the carcass 84 thus elevated to the top of the guides, the stands 78 are then free to receive a still further carcass 120. The press will generally remain in this position with a carcass on the stand, one held by the loader in its up position, and a tire being cured until the curing cycle time of the press is completed. Upon completion of the cycle, the bladder ram 18 will extend pushing the bladder 15 back into the well 14 stripping the bladder from the interior of the now at least partially cured tire. The press then opens or moves to its slide-back position as seen in FIG. 4 and it is noted that the extension of the ram 18 moves the chuck segments 22 beneath the top bead of the cured tire locking the same to the top toe ring. When the ram is retracted, the segments will also be retracted permitting the tire to be stripped therefrom as indicated in FIG. 1.

The carcass 84 is now laterally shifted with the opening of the press head to be aligned vertically with the bottom toe rings of the bottom mold section. The loader now descends with the carcass 84 placing the same on the bottom mold section in the same manner as in FIG. 1 to repeat the afore-described cycle.

It can now be seen that there is provided a unique tire curing press providing a combination stand and loader which will permit partially formed tire carcasses of a relatively flimsy nature readily to be loaded into the tire press in the highly automated manner as shown for more conventional tire carcasses in the aforesaid Mallory et al. Patent No. 3,065,503.

Other modes of applying the principle of the invention may be employed, change being made as regards the details described, provided the features stated in any of the following claims or the equivalent of such be employed.

We, therefore, particularly point out and distinctly claim as our invention:

1. In combination, a stand, means on said stand to support a tire carcass by its upper bead, a carcass loader for a tire press comprising radially movable chuck segments adapted to engage beneath the upper bead of such carcass thus supported by said stand, a substantially annular plate coaxially disposed with respect to said segments and immediately subjacent said segments, and means operative to move said segments radially beyond said plate to grip such carcass held by said stand, said plate interfitting with said stand when said loader is in position to grip such carcass.

2. The combination set forth in claim 1 wherein said stand comprises upstanding posts, and notches in said plate accommodating said posts as said loader moves to engage a carcass held by said stand.

3. The combination set forth in claim 2 including means radially to move said posts whereby said stand will accommodate carcasses of different size.

4. In combination, a tire press loader including a tire carcass chuck, a vertically extending guide, means mounting said chuck on said vertically extending guide for movement therealong, a carcass supporting stand, means to shift said guide means from a position wherein said chuck is aligned with said stand to a position where it is aligned with the stationary mold section of such press, means operative to move said chuck along said guide whereby said chuck will pick up a carcass from said stand and place such carcass centrally with respect to the stationary mold section when said guide means is thus shifted, a forming bladder adapted to be mounted in the stationary mold section, and horizontal plate means on said loader cooperating with said chuck operative to center said bladder with rsepect to such carcass and cause such bladder to swell into such carcass while still held by said chuck.

5. In combination, a tire press loader including a tire carcass chuck, a vertically extending guide, means mounting said chuck on said vertically extending guide for movement therealong, a carcass supporting stand, means to shift said guide means from a position wherein said chuck is aligned with said stand to a position where it is aligned with the stationary mold section of such press when opened, means operative to move said chuck along said guide whereby said chuck will pick up a carcass from said stand and place such carcass centrally with respect to such stationary mold section when said guide means is thus shifted, a forming bladder adapted to be mounted in such stationary mold section, means on said loader cooperating with said chuck operative to center said bladder with respect to such carcass and cause such bladder to swell into such carcass while still held by such chuck, said last mentioned means comprising an annular plate and a centrally disposed protuberance thereon, and a recess in said bladder adapted to engage said protuberance as said bladder moves thereagainst.

6. A carcass loader for a tire curing press of the type having a stationary mold section, a movable mold section arranged for movement away from and then laterally of said stationary mold section, and a forming bladder in said stationary mold section, said loader comprising a carcass holder and a vertically extending holder guide adapted to be mounted on such press, means operative to move said holder vertically along said guide to and from a carcass receiving position, means operative laterally to shift said guide and thus said holder vertically to align said holder with such stationary mold section whereupon further movement of said holder along said guide will place such carcass on such stationary mold section preparatory to shaping and curing such carcass when such press is closed, said holder comprising radially movable chuck segments adapted to engage beneath the upper bead of such carcass, a fixed substantially annular plate subjacent said segments, and a central protuberance on said plate, said plate and protuberance cooperating with such bladder while said segments hold such carcass on such stationary mold section.

7. A carcass stand for an automatically loaded tire curing press comprising a base adapted to be positioned in front of such press, and a plurality of circumferentially spaced carcass bead engaging latch means mounted on said base operative to pass the lower bead of such carcass but catch the upper bead of such carcass to support such carcass on said stand suspended from its upper bead.

8. A carcass stand as set forth in claim 7 wherein said latch means each comprise two bead engaging projections extending substantially normal to each other, and means mounting said latch means for pivotal movement alternately to extend said projections horizontally.

9. A carcass stand as set forth in claim 8 including spring means resiliently to hold said latch means in alternate positions.

10. A carcass stand as set forth in claim 9 including circumferentially spaced posts supporting said latch means, and means uniformly simultaneously radially to move said posts to adjust said stand for different size tire carcasses.

11. A carcass stand as set forth in claim 10 wherein the spring pressure holding said latch means in one of said alternate positions is greater than in the other.

12. A carcass loader for a tire curing press having a bag forming device comprising radially movable chuck segments adapted to engage beneath the upper bead of a tire carcass, a substantially annular plate coaxially disposed with respect to said segments and immediately subjacent said segments operative to cooperate with said bag forming device to cause the same properly to swell within such tire, and means operative to move said segments radially beyond the periphery of said plate to grip such carcass and to retract said segments above said plate to release such carcass.

13. A carcass supporting stand for an automatically loaded tire curing press comprising a base, a plurality of carcass bead engaging members mounted on said base, and means mounting said members for pivotal movement in response to movement of a carcass bead therepast, such pivotal movement horizontally extending a projecting portion of said members to engage and support the upper bead of such carcass.

14. In combination, a loader for a tire press operative to grip the top bead of a tire carcass and place such carcass in such press, and a stand, said stand including means operative to support a carcass suspended from its top bead thus properly positioned to be picked up by said loader.

15. In combination, a loader for a tire press operative to grip the top bead of a tire carcass and place such carcass in such press; and a stand, said stand including means operative to support a carcass by its top bead properly to present such top bead to be gripped by said loader, said stand and loader each comprising a set of carcass top bead engaging members with the set of members of the stand being circumferentially offset and interfitting with the set of members of the loader.

16. In combination, a tire carcass supporting stand for a tire curing press comprising a plurality of carcass bead engaging projections operative to engage the upper bead of such carcass and support the same suspended therefrom, and a loader for such press operative to engage the upper bead of such carcass thus supported by said stand and remove the same therefrom to place it in such press.

References Cited by the Examiner

UNITED STATES PATENTS

| | | | |
|---|---|---|---|
| 2,997,738 | 8/1961 | Soderquist | 18—2 XR |
| 3,065,499 | 11/1962 | Brundage et al. | 18—2 |
| 3,069,503 | 11/1962 | Mallory et al. | |
| 3,134,136 | 5/1964 | Soderquist | 18—2 |

J. SPENCER OVERHOLSER, *Primary Examiner.*

MICHAEL V. BRINDISI, *Examiner.*